3,218,159
MANUFACTURE OF PURE BISMUTH
Roger Champ, Bourg-la-Reine, France, assignor to La Societe Les Produits Semi-Conducteurs, Paris, France
Filed Apr. 10, 1961, Ser. No. 101,982
Claims priority, application France, Mar. 13, 1961, 855,392
2 Claims. (Cl. 75—63)

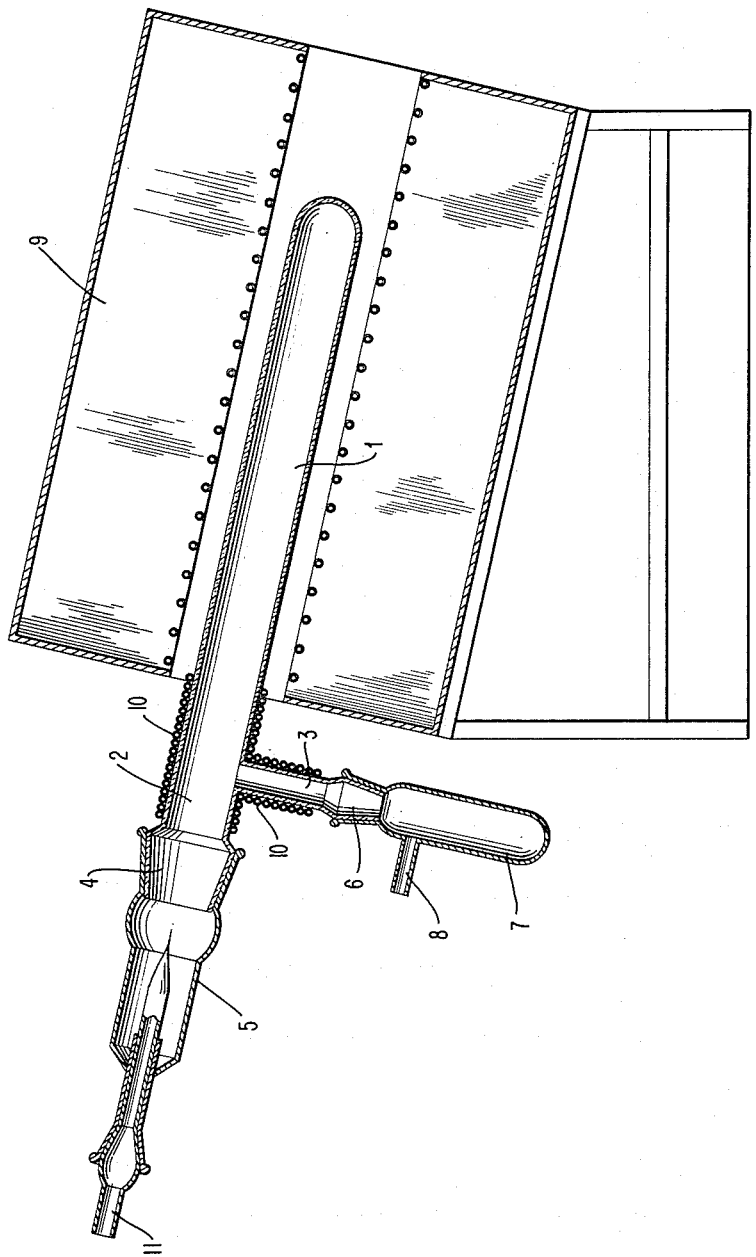

This invention relates to the purification of bismuth and the production of bismuth of high purity.

The known methods of purifying bismuth are simple in appearance but hard to employ, particularly when bismuth in molten state, which is of high density, is associated with lighter substances such as sulfur, soda, and in some cases gases which are useful in the purification.

It is an object of the invention to produce bismuth of high purity, for example bismuth containing impurity in a degree not greater than the error in methods of analysis or containing impurities on the order of a part per million. The process of the invention is particularly useful in the further purification of bismuth which has already been brought to a condition above 95% pure and preferably about 99.5% pure. The apparatus of the invention is extremely simple, in this matching the simplicity of the novel process. The process is useful in attaining not only extreme purity but lesser degrees of high purity, as desired.

The objects of the invention are accomplished generally speaking by a method of preparing very pure bismuth which comprises selectively distilling impure bismuth in two steps, in the first of which lower volatilizing impurities are vaporized under vacuum and isolated, and in the second of which bismuth is volatilized from higher volatilizing impurities under vacuum and is isolated in solid phase.

The process involves subjecting the impure bismuth to selective distillation in two steps, in the first of which the bismuth is heated under high vacuum on the order of $10^{-4}$ to $10^{-2}$ mm. Hg at a temperature on the order of 500–600° C., which removes the more volatile impurities such as arsenic, sulfur, tellurium, magnesium, zinc, from the bismuth, and in the second of which the vacuum is reduced to the order of 1–4 mm. Hg and the temperature is raised to the order of 720–750° C. at which the bismuth volatilizes to the exclusion of less volatile impurities, is withdrawn and condensed. The method can be repeated as often as is necessary to attain the preselected degree of purity.

When the bismuth is less pure than 99.5% it is preferred to purify it chemically prior to the purification by volatilization. A process for doing this involves precipitating the bismuth as its phosphate, transforming the phosphate to bismuth oxide, and reducing the oxide to metallic bismuth from which impurities such as alkali metals, and alkaline earth metals and silver have been eliminated.

In performing this preliminary purification the crude bismuth is attacked by concentrated nitric acid, which is added progressively to even the attack and prevent the addition of any great excess of acid. The reaction mass is then neutralized by ammonia until precipitation begins, whereupon a small addition of nitric acid is made to return the mass to the acid side. The mass is filtered, the filtrate is boiled in the presence of a dilute solution of diammonium phosphate, which precipitates the bismuth as phosphate. The precipitate is removed from the liquid, washed, and dried at 200° C. to constant weight. This phosphate is then attacked by a concentrated aqueous solution of caustic soda, producing bismuth oxide, which is filtered and dried anew. The precipitated oxide is then reduced by pure hydrogen at 550° C., producing bismuth practically free of silver, sodium, potassium, magnesium and calcium and of general purity approximating 99.5%. Bismuth of such purity is useful in some fields but not in the production of semi-conductors.

In the practice of the novel process of producing bismuth of high purity the bismuth of 99.5% purity is heated slowly up to a temperature of 500–600° C., depending on the pressure used. When the pressure is between $10^{-4}$ and $10^{-2}$ mm. Hg the temperature will be on the order of 600–620° C. At this temperature the elements more volatile than bismuth vaporize, including arsenic, sulfur, tellurium, magnesium, and zinc and are drawn off and recovered separately. When the bismuth begins to distill, which is observed by the collection of some of it on the walls of the condenser, the temperature rise is ended and the temperature is reduced, and maintained constant for some time, e.g. for half an hour, at 540° C. and $10^{-3}$ mm. Hg. At the end of this time the substantial totality of more volatile elements have been eliminated. The loss of weight at the end of this stage of the process is about 5–10% of the weight of raw material.

The second stage of the process is then performed. The vacuum is broken by introducing an inert gas such as pure argon or nitrogen, the pressure being established between 1 and 4 mm. Hg. The temperature is increased to a temperature at which the bismuth distills off, being condensed practically pure and free from iron, nickel, cobalt, lead and tin which have lower vapor tension than bismuth and remain in the vaporization chamber. It is advisable to level the temperature off at 720° to 750° C. to prevent the distillation of such impurities.

In most cases the bismuth thus produced is very pure and suited to almost any use, but occasionally it may be desired to produce bismuth containing less than one part per million of each impurity while maintaining the good yield of the method. In this case the condensed bismuth from the process described, already very pure, is recycled and subjected again to the same process.

The following example explains the invention without limiting the generality of what has been elsewhere herein stated.

The single figure of the drawing is a somewhat schematic view partially in vertical section and partially in elevation of a convenient apparatus by which the method of the invention may be performed.

The novel apparatus includes a silica distillation tube 1 having two ports 2, 3 of which 2 is provided with a sleeve 4 for the attachment of a conduit 5 for inert gas, and of which 3 is provided with a sleeve 6 for the attachment of condenser 7. The condenser has a port 8 to which a vacuum pump is attached, and a body to receive the bismuth. The tube 1 is inserted in a resistor furnace 9 and the parts of the tube exterior to the furnace are supplied with insulating or heating means 10, to prevent cooling and premature condensation of the distillate.

Into this apparatus is placed 200 parts by weight of bismuth of about 99.5% purity, the pressure is reduced to $10^{-4}$ mm. Hg and the furnace is progressively heated to 600° C. When the first traces of the bismuth appear in the condenser the temperature rise is arrested and a half hour is allowed to pass without further increase of temperature. About 12 parts by weight are removed from the distilland during this stage.

The vacuum is now broken by opening valve 11 to the flow of argon and pressure is raised to 4 mm. Hg. The temperature is gradually raised to 750° C., and the condenser receives 180 parts of pure metallic bismuth.

The residue is discharged from the vaporization tube and the 180 parts of bismuth from the condenser are put into the tube. The process above described is then repeated. During the first, low pressure stage of this repeated purification about 15 parts by weight of impurity is removed and during the second, higher pressure stage the total weight of bismuth recovered in the condenser is 160 g.

Upon spectrographic examination the bismuth appears without impurity superior to the error of the mechanism and analytical process, that is to say about one part per million of each impurity. This bismuth is satisfactory for use as it is in the manufacture of binary or ternary semiconductor compositions.

The main advantage of the invention is the process of making pure bismuth by a simple method requiring only simple apparatus and control.

As many apparently widely different embodiments of the present invention may be made without departing from the spirit and scope thereof, it is to be understood that the invention is not limited to the specific embodiments.

What is claimed is:

1. A method of preparing very pure bismuth which comprises subjecting bismuth containing on the order of .5% of impurities by weight to a vacuum on the order of $10^{-2}$ to $10^{-4}$ mm. Hg, heating the bismuth progressively through the volatilizing range of impurities of the group consisting of arsenic, sulfur, tellurium, magnesium and zinc and separating the volatilized impurities from the bismuth-containing solid residue, arresting the rise in temperature at about 600° C., and reducing the temperature to about 540° C. for about a half hour, increasing the pressure by adding inert gas to attain about 4 mm. Hg, raising the temperature to about 750°, and condensing the Bi as it distills.

2. A method according to claim 1, comprising repeatedly subjecting the bismuth which is isolated in solid phase to the first and second steps of the method.

References Cited by the Examiner

UNITED STATES PATENTS

| | | | |
|---|---|---|---|
| 1,870,388 | 8/1932 | Smith | 75—70 |
| 2,239,370 | 4/1941 | Osborn et al. | 75—63 |
| 2,239,371 | 4/1941 | Osborn et al. | 75—63 |
| 2,279,900 | 4/1942 | Christensen | 75—63 |
| 2,342,733 | 2/1944 | Guyard | 75—70 |
| 2,456,935 | 12/1948 | Fisher | 75—70 X |
| 2,784,080 | 3/1957 | Schmidt | 75—63 |
| 3,010,821 | 11/1961 | Platt | 75—63 |

BENJAMIN HENKIN, *Primary Examiner.*

RAY K. WINDHAM, ROGER L. CAMPBELL, DAVID L. RECK, *Examiners.*